Figures 1, 2, 3:
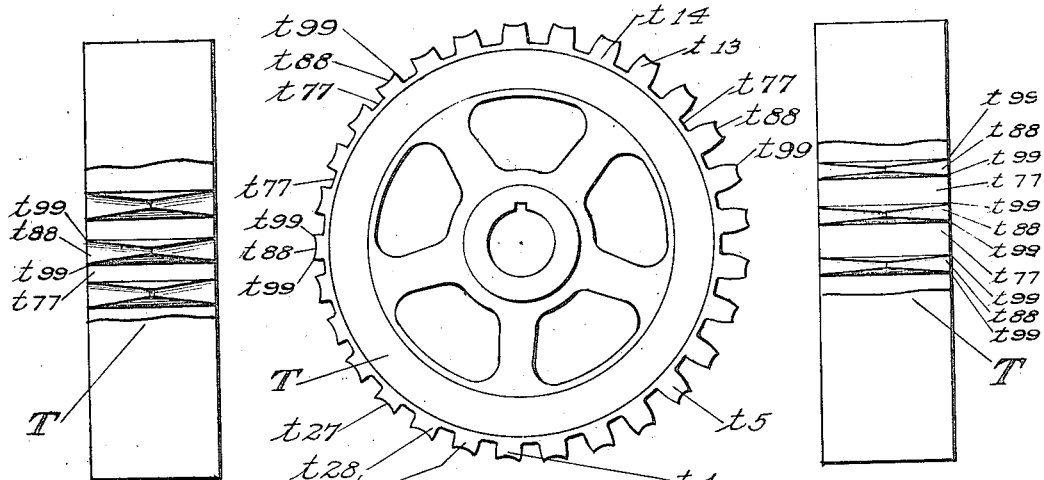
Figures 4, 5, 6:
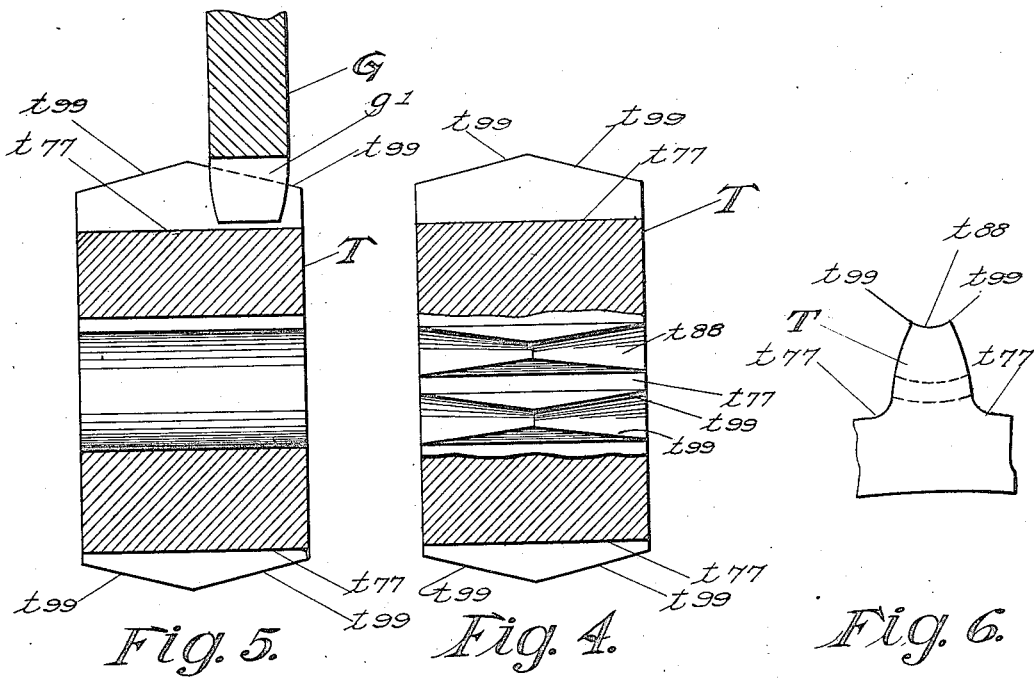

E. J. LEES.
GEAR TEETH FINISHING TOOL.
APPLICATION FILED MAY 19, 1914.

1,168,402. Patented Jan. 18, 1916.

Witnesses
A. D. Schrader
Edw. Lindemueller
Mary Coleman

Inventor,
ERNEST J. LEES.
By his att'y

UNITED STATES PATENT OFFICE.

ERNEST J. LEES, OF CLEVELAND, OHIO.

GEAR-TEETH-FINISHING TOOL.

1,168,402.　　　　　　Specification of Letters Patent.　　Patented Jan. 18, 1916.

Application filed May 19, 1914. Serial No. 839,529.

*To all whom it may concern:*

Be it known that I, ERNEST J. LEES, a citizen of the United States, residing at Cleveland, in the county of Cuyahoga and State of Ohio, have invented a new and useful Improvement in Gear-Teeth-Finishing Tools, of which the following is a specification, the principle of the invention being herein explained and the best mode in which I have contemplated applying that principle, so as to distinguish it from other inventions.

My invention relates to a tool suitable for practising the "Method of finishing gear teeth" as shown, described and claimed in my copending application, filed May 9th, 1914, Ser. No. 837,404.

The object of this tool is to perfect the generating action and hence the results of an ordinary hob.

A further object is the provision of a simple, durable and economical construction.

A tool constructed after the manner of my invention is adapted to exercise its function of effecting cuts from the faces of the teeth on the gear to be finished while running in mesh therewith with a hunting tooth action. Either the gear or the tool or both may be positively driven. The tool is provided with cutting edges whose radial extent of projection relatively to each other shall have been accurately determined according to a predetermined mating standard or precision of finish which it is desired to impart to the faces of the teeth on the gear to be operated upon. The drawing exemplifies an involute type of tooth. For purposes of convenience of reference to my earlier identified copending "method" application with which this tool is in the nature of the case so intimately associated, the same ratio of hunting tooth action will be employed, namely, thirty (30) teeth on the gear and twenty-nine (29) teeth on the tool which is to be run in precise mesh therewith. The construction of my inventive tool furthermore involves the arrangement by grinding or otherwise forming of a series of the cutting edges over a camlike surface, and again by way of exemplification merely in this instance over a true eccentric curve. It is essential in the meantime, that the clearance line of the tool be maintained concentric and also that there be no tooth upon the tool but which projects some distance above the working depth. These two essentials are for the purpose of insuring a constant and true enmeshing of the gear and tool. The perimeter of the tool established by the tops of the teeth is therefore by preference composed of a plurality of cutting edges disposed therearound in uniform but not necessarily unbroken progression relative to the pitch line and within the limits of a tooth or teeth of full or nearly full depth and a tooth or teeth having a depth permitting them to project to the smallest feasible extent above the working depth.

The top of each tooth on the tool forms at the junctions with the tool faces a pair of angular cutting edges variously depressed toward or disposed different distances from the axis and every other one of which is idle during a revolution in a given direction. In other words, a working and an idle cutting edge of each tooth, considered as a whole, or points therein within a given normal plane, are spaced different distances from the axis.

In operation the revolutions of the gear and tool are reversed at regular intervals in order that all the cutting edges are brought into play. The usual in and out and longitudinal movements of the tool that is, perpendicular and parallel with respect to the axes respectively are to be implied if desirable. As should now be readily understood by those sufficiently conversant with the art, the cutting edges of my inventive tool are presented with a constantly varying action one component being a radial movement and in so far the novelty and utility of the tool itself is heralded. Other perfecting details in the configuration of the tool will be hereinafter particularly described.

My invention lends itself equally well when properly modified to types of gear wheels other than the spur type.

Figure I is a plan of a gear teeth finishing tool embodying my invention, and particularly adapted for spur gear work. Fig. II is a diagrammatic representation of a portion of the perimeter of the tool, the same being in the nature of a projection of a few of the cutting edges thereof and for the purpose of indicating relative distances therebetween. Fig. III is a view corresponding to Fig. II of a few cutting edges on the opposite side of the tool. Fig. IV is an elevation of a portion of the perimeter of my tool fully showing but two teeth while others are broken away. Fig. V is a section of a tool embodying my invention in mesh with the tooth of a gear wheel to be finished. Fig. VI is an enlarged detail of one element of the tool.

Throughout the several views in the drawing the same characters of reference are employed as in my copending application already hereinbefore identified.

The tool T which should be produced from high-grade tempered steel is shown to comprise twenty-nine teeth of involute type and these have been designated respectively by the reference characters $t'$ to $t^{29}$ respectively. It will be seen that the perimeter of the tool has been ground to assume an eccentric form relative to a concentric clearance line $t^{77}$. In addition to the grinding of the tops of the teeth variously with respect to each other, each toothed top is ground with equisized beveled surfaces sloping endwise, that is, laterally from the median plane of the tool toward the bore thereof. These surfaces are equisized as a mere matter of convenience. They are furthermore each concaved. Such concaved converging halves of each tooth top have been designated by the reference character $t^{88}$, while the two distinct obtuse angled pairs of cutting edges of each tooth which have been accentuated by reason of the concaved nature of the surfaces $t^{88}$, have all been designated by the reference character $t^{99}$. The two pairs of cutting edges $t^{99}$ generate two pairs of conical surfaces respectively.

The purpose in providing converging cutting edges at the upper extremities of each of the faces of the teeth on the tool is to make possible a shearing cut from the faces of the gear to be cut. The constantly varying action of the tool is thereby additionally compound to the end of bringing about a nicer merging of the cuts upon any particular face of the gear to be cut by different teeth on the tool. In practice the gear and tool are revolved in one direction at least a sufficient number of revolutions to have concluded one cycle of the differential action or, in other words, brought all the alternate cutting edges in successive cutting engagement with all of the corresponding faces on the gear to be cut.

My invention being thus described with sufficient thoroughness, what I desire to secure by Letters Patent and therefore claim specifically, is:

1. A gear tooth finishing tool comprising a tooth having a cutting edge at the junction of the top with each of its faces, such cutting edges being disposed different distances from and at different angles to the axis of the tool.

2. A gear tooth finishing tool, provided with teeth each having the junctions of their tops with their opposite faces respectively lying in two pairs of distinct conical surfaces to form four distinct cutting edges, said intersecting pairs of conical surfaces each having respectively a different relation to the axis.

3. A gear tooth finishing tool, provided with a tooth having the two junctions of its top with its opposite faces each disposed in two intersecting conical surfaces to form two distinct cutting edges for each direction of rotation.

4. A gear tooth finishing tool, provided with a plurality of teeth each having a pair of cutting edges variously depressed as a whole.

5. A gear tooth finishing tool, provided with a tooth having a cutting edge, and its top concave adjacent such edge, said edge furthermore depressed relative to the top of another tooth, for the useful purpose specified.

6. A gear tooth finishing tool, the top of one tooth thereof being eccentric relative to the center of rotation of such tool, said top furthermore forming with each of the faces of the tooth a cutting edge inclined to the axis.

7. A gear tooth finishing tool, the top of one tooth thereof conforming to a perimeter eccentric relative to the center of rotation of such tool, said top furthermore forming with each of the faces of the tooth a pair of intersecting cutting edges inclined toward the axis.

8. A gear tooth finishing tool, provided with a beveled tooth having a pair of distinct cutting edges, and its top surface concave adjacent such edges, one of said edges furthermore depressed relative to the top of another tooth.

9. A gear tooth finishing tool, provided with a beveled tooth having two pairs of intersecting cutting edges respectively.

10. A gear tooth finishing tool, provided with teeth having beveled tops each formed with two pairs of intersecting cutting edges respectively, said tops being concave adjacent such edges, one of said tops furthermore depressed toward the axis relative to another top.

11. A gear teeth finishing tool in the form of a gear provided with teeth each provided with a pair of cutting edges adapted to generate intersecting conical surfaces respectively.

12. A gear tooth finishing tool comprising a tooth having its top widening in a direction toward the end of the tooth.

13. A gear tooth finishing tool comprising a gear provided with a tooth having its top progressively widening in opposite directions away from the median plane of the gear.

14. A gear tooth finishing tool, comprising a gear having a plurality of involute teeth each provided with a pair of cutting edges, such cutting edges of each tooth being disposed different distances from and sloping with respect to the axis of the tool, for the useful purpose specified.

15. A gear tooth finishing tool, comprising a gear having a plurality of beveled teeth each provided with two pairs of cutting edges, one pair of the cutting edges of each such tooth being disposed nearer the axis of the tool than the other pair of cutting edges of the same tooth.

16. A gear teeth finishing tool having a plurality of teeth provided with beveled tops having cutting edges, such tops being furthermore concave, such edges of each tooth being differently spaced from the pitch line.

17. A gear tooth finishing tool comprising a gear having involute teeth, the junction of each of the faces with the tops of a plurality of teeth respectively being fashioned as angular cutting edges.

18. A gear teeth finishing tool having teeth each provided with a pair of cutting edges, the latter being accentuated by a concavity extending therebetween.

19. A gear teeth finishing tool in the form of a gear having its perimeter provided with gear teeth having endwise sloping top surfaces, for the useful purpose specified.

20. A gear teeth finishing tool provided with teeth having concave top surfaces concaved along a cutting edge in a direction from side to side, for the useful purpose specified.

21. A gear teeth finishing tool comprising a gear of the spur type provided with teeth having a cutting edge adapted to generate a conical surface, for the useful purpose specified.

22. A gear teeth finishing tool provided with teeth each provided with two pairs of cutting edges adapted to generate two pairs of conical surfaces respectively, the generatrices of one pair of such surfaces intersecting each other.

23. A gear teeth finishing tool provided with teeth each provided with two pairs of cutting edges adapted to generate four distinct conical surfaces.

24. A gear teeth finishing tool in the form of a gear provided with teeth each provided with a pair of differently sloping top surfaces, an edge of each of said surfaces being fashioned as a cutting edge.

25. A gear teeth finishing tool consisting of a gear of the spur type each tooth of which is formed with a pair of converging cutting edges.

26. A gear teeth finishing tool comprising a gear of the spur type provided with involute teeth each provided with a pair of differently sloping top surfaces, opposite edges of each of said surfaces being fashioned as cutting edges.

27. A gear teeth finishing tool comprising a gear having its perimeter fashioned with involute teeth, a plurality of such teeth being provided each with a pair of cutting edges extending at different angles relative to the axis, said edges being furthermore disposed different distances from the axis for the useful purpose specified.

28. A gear tooth finishing tool comprising a gear of the spur type provided with a tooth having a beveled top whereby to form a cutting edge not disposed within any axial plane.

Signed by me, this 7th day of May, 1914.

ERNEST J. LEES.

Attested by—
MARY COLEMAN,
A. L. SCHLEGEL.